US012632926B2

(12) United States Patent
Petersen et al.

(10) Patent No.: US 12,632,926 B2
(45) Date of Patent: May 19, 2026

(54) FRAME ENHANCEMENT USING A DIFFUSION MODEL

(71) Applicant: QUALCOMM Incorporated, San Diego, CA (US)

(72) Inventors: Jens Petersen, Amsterdam (NL); Michal Jakub Stypulkowski, Wroclaw (PL); Noor Fathima Khanum Mohamed Ghouse, Amsterdam (NL); Auke Joris Wiggers, Amsterdam (NL); Guillaume Konrad Sautiere, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 18/362,589

(22) Filed: Jul. 31, 2023

(65) Prior Publication Data

US 2024/0378698 A1     Nov. 14, 2024

Related U.S. Application Data

(60) Provisional application No. 63/501,054, filed on May 9, 2023.

(51) Int. Cl.
*G06T 5/50*          (2006.01)
*G06T 3/18*          (2024.01)
          (Continued)

(52) U.S. Cl.
CPC .................. *G06T 5/50* (2013.01); *G06T 3/18* (2024.01); *G06T 3/4046* (2013.01);
          (Continued)

(58) Field of Classification Search
None
See application file for complete search history.

(56) References Cited

U.S. PATENT DOCUMENTS

| | | | |
|---|---|---|---|
| 2020/0111194 A1* | 4/2020 | Wang | G06T 3/4076 |
| 2021/0136394 A1* | 5/2021 | Sakamoto | H04N 19/186 |
| 2022/0383452 A1* | 12/2022 | Lu | G06N 3/094 |

FOREIGN PATENT DOCUMENTS

| | | | | |
|---|---|---|---|---|
| WO | 2019136077 A1 | 7/2019 | | |
| WO | WO-2023060746 A1 * | 4/2023 | | G06T 3/4053 |

OTHER PUBLICATIONS

International Search Report and Written Opinion—PCT/US2024/027292—ISA/EPO—Aug. 6, 2024.
(Continued)

*Primary Examiner* — Jiangeng Sun
(74) *Attorney, Agent, or Firm* — QUALCOMM Incorporated; Espartaco Diaz Hidalgo

(57)          ABSTRACT

Systems and techniques are provided for processing image data. According to some aspects, a computing device can determine an optical flow between a current frame having a first resolution and a first previous frame having the first resolution. The computing device can warp a second previous frame having a second resolution based on the determined optical flow to generate a warped previous frame having the second resolution, the second resolution being higher than the first resolution. The computing device can process, using a diffusion machine learning model, a noise frame, the current frame, and the warped previous frame to generate an output frame having the second resolution.

30 Claims, 9 Drawing Sheets

(51) Int. Cl.
  *G06T 3/4046*       (2024.01)
  *G06T 3/4053*       (2024.01)
  *G06T 5/70*         (2024.01)
  *G06T 7/246*        (2017.01)

(52) U.S. Cl.
  CPC .............. *G06T 3/4053* (2013.01); *G06T 5/70*
        (2024.01); *G06T 7/248* (2017.01); *G06T*
        *2207/10016* (2013.01); *G06T 2207/20081*
        (2013.01); *G06T 2207/20084* (2013.01)

(56)                References Cited

OTHER PUBLICATIONS

Jiang Z., et al., "Practical Super-resolution from Dynamic Video Sequences", Proceedings of the 2003 IEEE Computer Society Conference on Computer Vision and Pattern Recognition, Jun. 18-20, 2003, Madison, Wisconsin, Los Alamitos, Calif. (U.A, vol. 2, Jun. 18, 2003, XP010644718, ISBN: 978-0-7695-1900-5 first Par. in Section 3 on p. 2 Sections 3.2 and 3.3 on p. 3 Section 3.4 on p. 4 (Left col.), 6 Pages.
Rota C., et al., "Enhancing Perceptual Quality in Video Super-Resolution through Temporally-Consistent Detail Synthesis using Diffusion Models", arXiv:2311.15908v1 [cs.CV] Nov. 27, 2023, XP093185790, 12 Pages.

* cited by examiner

202

FULLY CONNECTED

204

LOCALLY CONNECTED

210

212

214

216

800

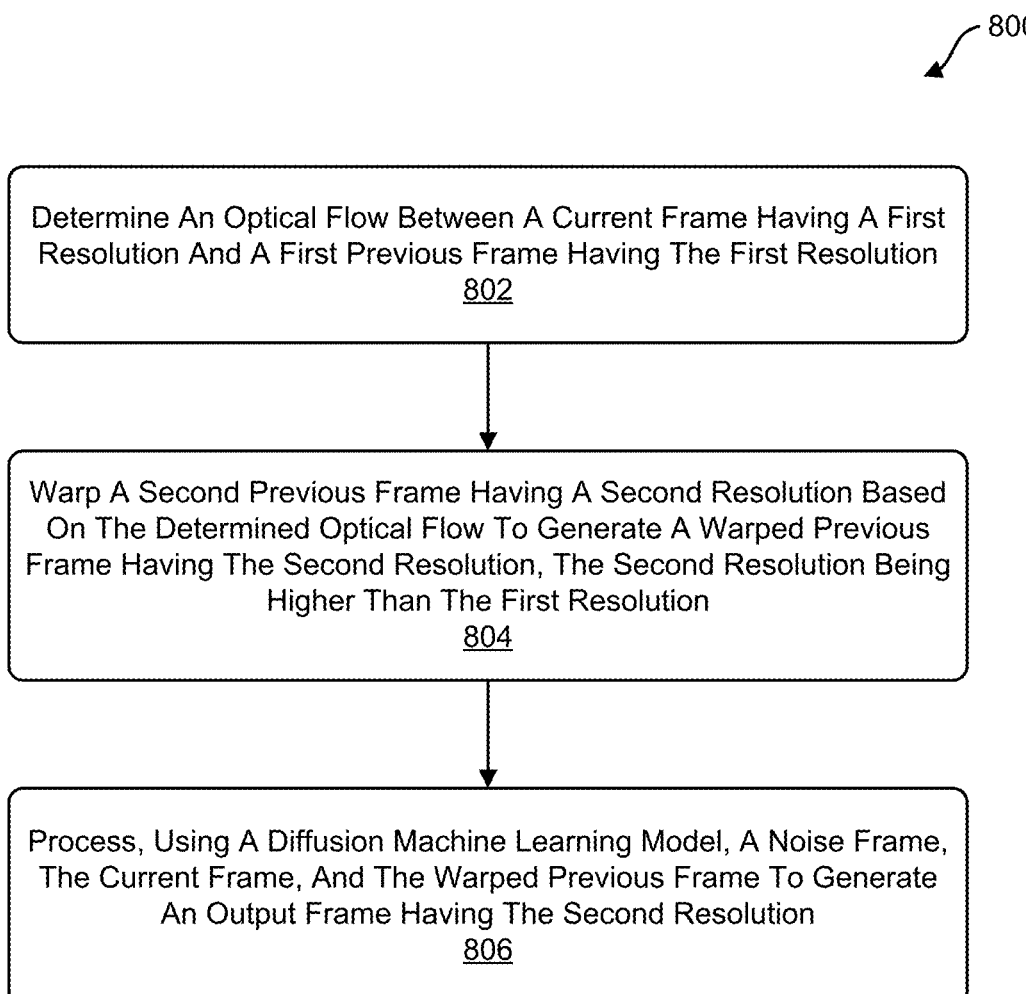

Determine An Optical Flow Between A Current Frame Having A First Resolution And A First Previous Frame Having The First Resolution
802

Warp A Second Previous Frame Having A Second Resolution Based On The Determined Optical Flow To Generate A Warped Previous Frame Having The Second Resolution, The Second Resolution Being Higher Than The First Resolution
804

Process, Using A Diffusion Machine Learning Model, A Noise Frame, The Current Frame, And The Warped Previous Frame To Generate An Output Frame Having The Second Resolution
806

FIG. 8

FRAME ENHANCEMENT USING A DIFFUSION MODEL

CROSS-REFERENCE TO RELATED APPLICATIONS

This application claims the benefit of U.S. Provisional Application No. 63/501,054, filed May 9, 2023 and titled "FRAME ENHANCEMENT USING A DIFFUSION MODEL," which is hereby incorporated by reference in its entirety and for all purposes.

FIELD

The present disclosure generally relates to video processing. For example, aspects of the present disclosure are related to systems and techniques for performing frame enhancement (e.g., video super-resolution, sharpening, etc.) using a diffusion model.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

An artificial neural network attempts to replicate, using computer technology, logical reasoning performed by the biological neural networks that constitute animal brains. Deep neural networks, such as convolutional neural networks, are widely used for numerous applications, such as object detection, object classification, object tracking, big data analysis, among others. For example, convolutional neural networks are able to extract high-level features, such as facial shapes, from an input image, and use these high-level features to output a probability that, for example, an input image includes a particular object.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing frame enhancement (e.g., video super-resolution, sharpening, etc.) using a diffusion model. According to at least one illustrative example, a method of processing image data of a current frame is provided. The method includes: determining an optical flow between the current frame having a first resolution and a first previous frame having the first resolution; warping a second previous frame having a second resolution based on the determined optical flow to generate a warped previous frame having the second resolution, the second resolution being higher than the first resolution; and processing, using a diffusion machine learning model, a noise frame, the current frame, and the warped previous frame to generate an output frame having the second resolution.

In another illustrative example, an apparatus is provided for processing image data of a current frame. The apparatus includes at least one memory configured to store the image data and at least one processor coupled to the at least one memory and configured to: determine an optical flow between the current frame having a first resolution and a first previous frame having the first resolution; warp a second previous frame having a second resolution based on the determined optical flow to generate a warped previous frame having the second resolution, the second resolution being higher than the first resolution; and process, using a diffusion machine learning model, a noise frame, the current frame, and the warped previous frame to generate an output frame having the second resolution.

In another illustrative example, a non-transitory computer-readable storage medium is provided comprising instructions stored thereon which, when executed by at least one processor, causes the at least one processor to: determine an optical flow between a current frame having a first resolution and a first previous frame having the first resolution; warp a second previous frame having a second resolution based on the determined optical flow to generate a warped previous frame having the second resolution, the second resolution being higher than the first resolution; and process, using a diffusion machine learning model, a noise frame, the current frame, and the warped previous frame to generate an output frame having the second resolution.

In another illustrative example, an apparatus is provided for processing image data of a current frame. The apparatus includes: means for determining an optical flow between the current frame having a first resolution and a first previous frame having the first resolution; means for warping a second previous frame having a second resolution based on the determined optical flow to generate a warped previous frame having the second resolution, the second resolution being higher than the first resolution; and means for processing, using a diffusion machine learning model, a noise frame, the current frame, and the warped previous frame to generate an output frame having the second resolution.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a flow diagram illustrating an example of a process for processing frame data, in accordance with some aspects.

DETAILED DESCRIPTION

Figure 1:
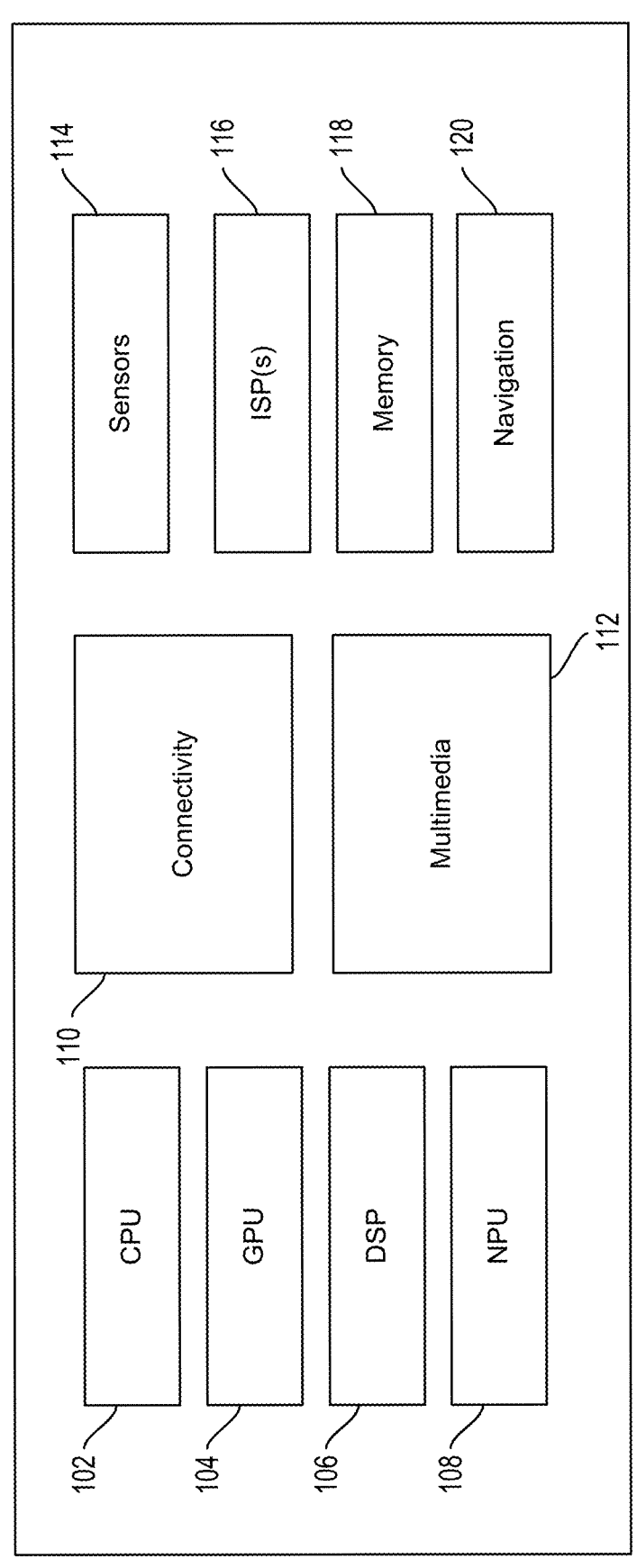
FIG. 1 illustrates an example implementation of a system-on-a-chip (SoC), in accordance with some aspects.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Demand for and consumption of image and video data has significantly increased in consumer and professional settings. As previously noted, devices and systems are commonly equipped with capabilities for capturing and processing image and video data. For example, a camera or a computing device including a camera (e.g., a mobile telephone or smartphone including one or more cameras) can capture a video and/or image of a scene, a person, an object, etc. The image and/or video can be captured and processed and then output (and/or stored) for consumption. The image and/or video can be further processed by one or more frame enhancement techniques for certain effects or improvements (e.g., improvements in quality, bitrate, etc.), such as super-resolution (upscaling or resolution enhancement), compression (also referred to as encoding), frame rate up-conversion, sharpening, color space conversion, image enhancement, high dynamic range (HDR), de-noising, low-light compensation, among others. The image and/or video can also be further processed for certain applications such as computer vision, extended reality (e.g., augmented reality, virtual reality, and the like), image recognition (e.g., face recognition, object recognition, scene recognition, etc.), and autonomous driving, among others. In some examples, the image and/or video can be processed using one or more image or video artificial intelligence (AI) models, which can include, but are not limited to, AI quality enhancement and AI augmentation models. As used herein, the terms "image processing" and "video processing" may be used interchangeably, such as in describing an image processing neural network and a video processing neural network (e.g., based on video data comprising a series of frames (e.g., images) that may be processed consecutively).

Image and video processing operations can be computationally intensive. In some cases, image and video processing operations can become increasingly computationally intensive as the resolution of the input image or frame of video data increases (e.g., as the number of pixels to be processed per input image or frame of video data increases). For example, a frame of video data with a 4K resolution can include approximately four times as many individual pixels as a frame of video data with a full HD (e.g., 1080p) resolution.

One example of an image or video processing technique is video super-resolution (VSR), which can be used for spatial super-resolution (for increasing resolution) and/or for temporal super-resolution (e.g., for increasing frame rate). For instance, VSR can be used to increase the spatial resolution of a video, such as from 720p to 1080p or from 1080p to 4K. VSR can be used to cheaply enhance user experience while reducing strain on a compute or bandwidth-expensive upstream task, such as video synthesis (e.g., in gaming) or video coding. One example of VSR technique for gaming is to generate, at lower resolution, extremely high quality but expensive frames (e.g., by performing ray-tracing) and "cheaply" interpolating frames to a higher resolution to maintain compute requirements at a reasonable amount. For instance, ray-tracing can be used to generate a high-quality low-resolution frame, and a VSR technique can be used to upsample the low-resolution frame to a higher resolution. In some cases, such a VSR technique can also perform temporal super-resolution (e.g., frame interpolation). In one illustrative example using a video coding setting, bitrate can be saved by encoding a 1080p video in 720p, and performing video super-resolution on a receiver-end, trading bitrate for compute (e.g., resulting in lower bitrate with higher computational expense). For instance, media hosting platforms may use such a technique to save in storage space and incur the compute cost on the receiver device.

VSR can be a highly complex high dimensional one-to-many mapping. Traditional VSR techniques optimize for distortion metrics like peak signal-to-noise ratio (PSNR), which is not well-aligned with humanly perceived quality. For example, by optimizing for distortion, a reconstructed frame may be very similar to an original frame from a distortion perspective, but may have low perceptual quality. Some machine learning-based VSR techniques optimize for perceptual quality (e.g., GAN-based VSR models), resulting in high perceptual quality (and thus nice looking results from a human perspective). However, such machine learning-based VSR techniques focus on still image super-resolution and not video or sequences of frames, resulting in temporal inconsistencies (e.g., flickering) when applied to video. Some techniques also assume an availability of future frames, and hence do not cater to low-delay applications such as teleconferencing, video streaming, etc. Some techniques may have both high quality and temporal consistency, but are restricted to specific applications (e.g., gaming) which require additional inputs (e.g., optical flow, depth maps, etc.) or to high-delay applications such as offline upscaling of historical videos. VSR techniques are needed that balance perceptual quality, temporal consistency, and latency.

Systems, apparatuses, processes (also referred to as methods), and computer-readable media (collectively referred to as "systems and techniques") are described herein for performing frame enhancement (e.g., video super-resolution, sharpening, etc.) using a diffusion model (referred to herein as a video enhancement diffusion model). The video enhancement diffusion model provides a general-purpose, high quality, low-delay frame enhancement (e.g., super-resolution, sharpening, etc.) algorithm enabling more general applications than existing super resolution systems. For instance, the video enhancement diffusion model can enable low-delay frame enhancement (e.g., super-resolution, sharpening, etc.) with high-perceptual quality and high temporal consistency based on at least three aspects, including diffusion-based training (which can provide perceptual quality), optical flow for temporal modeling through pixel- or feature-space warping using either optical flow estimation and backward warping or deformable convolutions (which can provide temporal consistency), and recurrent upsampling (which can provide low-delay) instead of parallel upsampling.

Various aspects of the present disclosure will be described with respect to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system. In some examples, the sensor processor 114 can be associated with or connected to one or more sensors for providing sensor input(s) to sensor processor 114. For example, the one or more sensors and the sensor processor 114 can be provided in, coupled to, or otherwise associated with a same computing device.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected. SOC 100 and/or components thereof may be configured to perform image processing using machine learning techniques according to aspects of the present disclosure discussed herein. For example, SOC 100 and/or components thereof may be configured to perform semantic image segmentation and/or object detection according to aspects of the present disclosure.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, diffusion-based neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Figure 4:
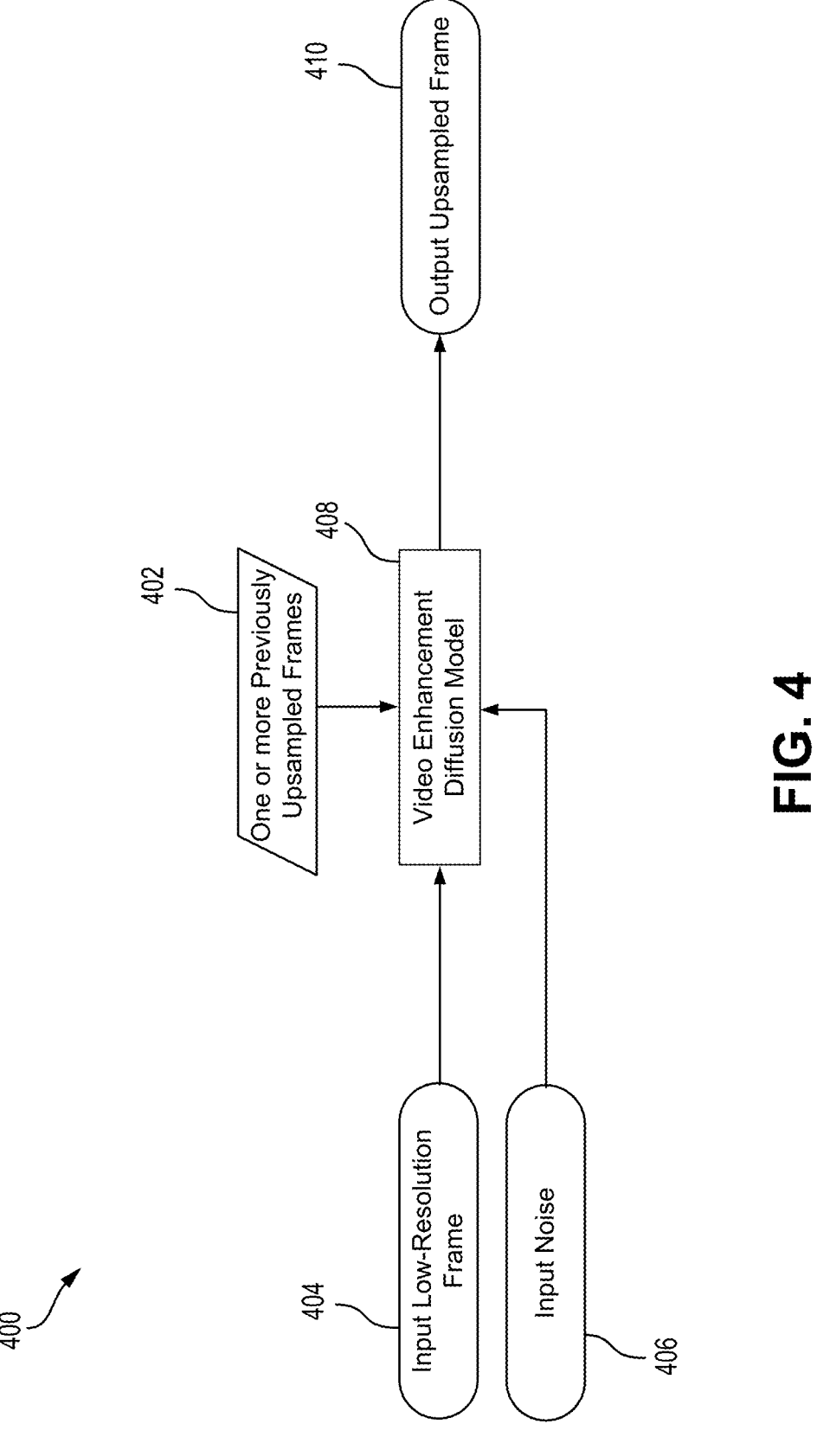
FIG. 4 is a diagram illustrating an example of a system for performing frame enhancement using a diffusion model, in accordance with some aspects.
Figure 5:
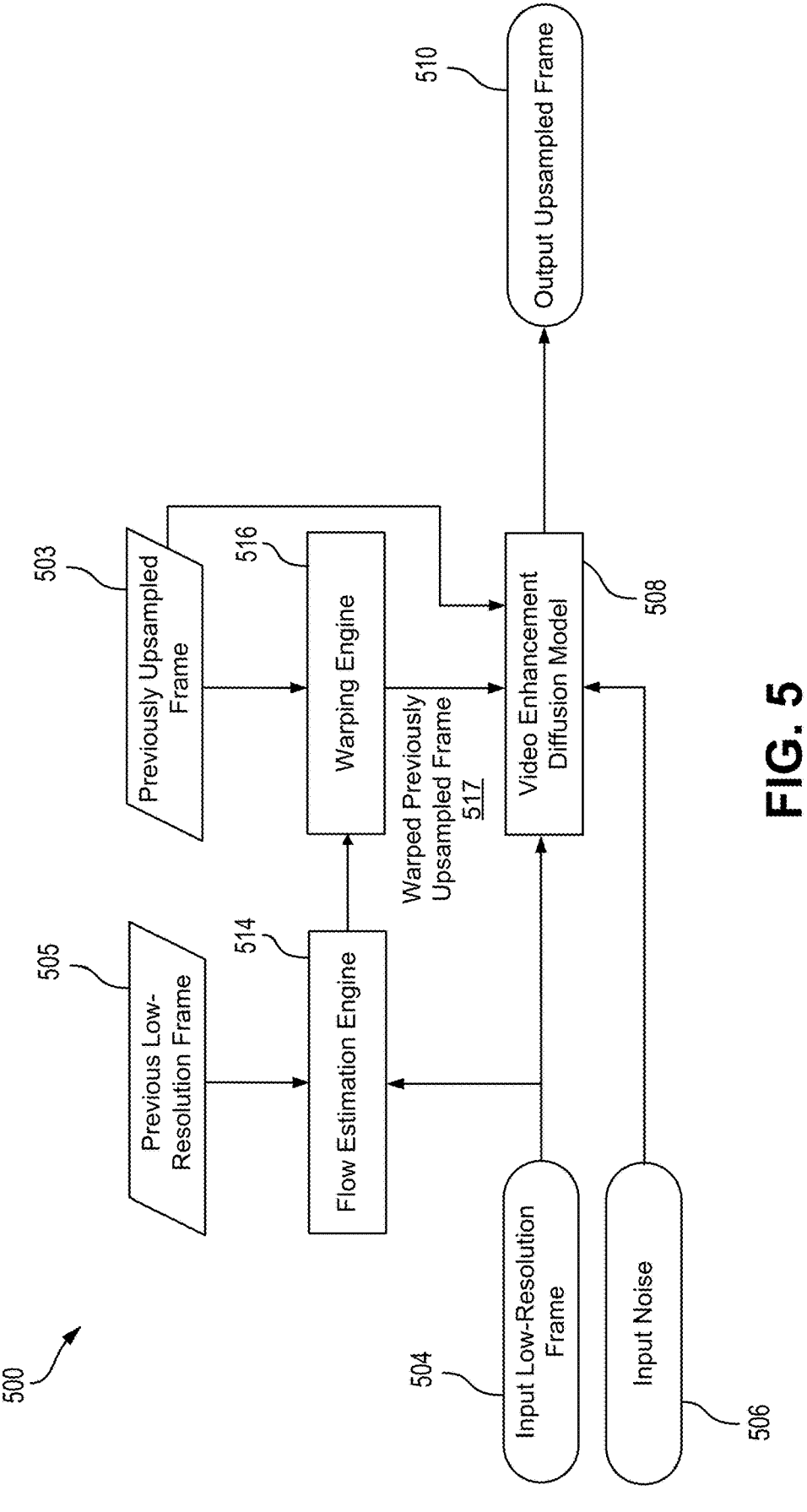
FIG. 5 is a diagram illustrating another example of a system for performing frame enhancement using a diffusion model, in accordance with some aspects.
Figure 6:
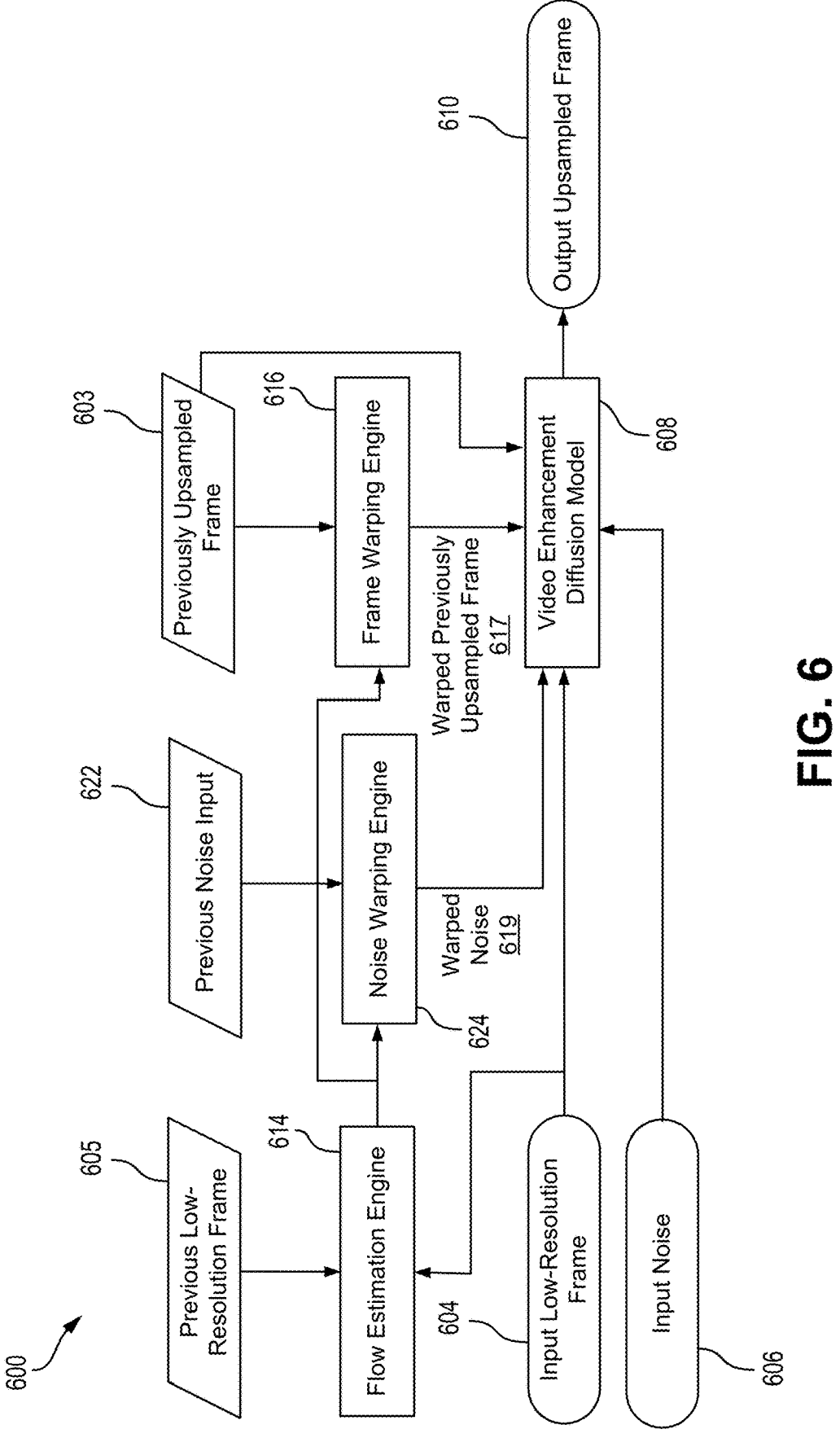
FIG. 6 is a diagram illustrating another example of a system for performing frame enhancement using a diffusion model, in accordance with some aspects.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence (for instance, an example of a recurrent neural network architecture is depicted in FIGS. 4 to 6, described in greater depth below). A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
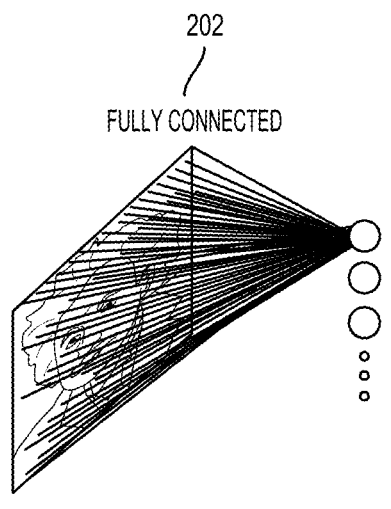
FIG. 2A illustrates an example of a fully connected neural network, in accordance with some aspects.
Figure 2B:
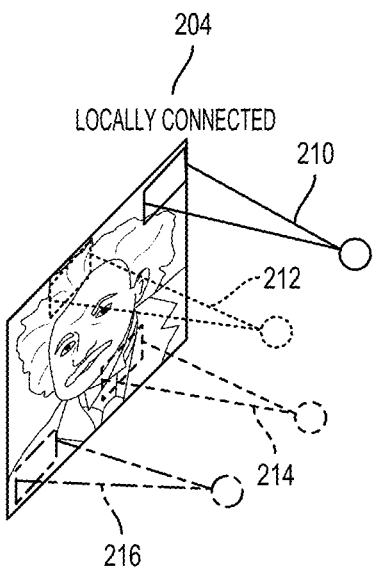
FIG. 2B illustrates an example of a locally connected neural network, in accordance with some aspects.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, as the higher layer neurons in a given region may receive inputs that are tuned through training to the properties of a restricted portion of the total input to the network.

As noted above, one class of machine learning models includes diffusion models (e.g., diffusion-based neural networks), which can also be referred to as diffusion probabilistic models. Diffusion models are latent-variable models. For example, a diffusion model defines a Markov chain of diffusion steps to slowly add random noise (e.g., Gaussian noise) to data and then learn to reverse the diffusion process to construct desired data samples from the noise. For instance, a diffusion model can be trained using a forward diffusion process (which is fixed) and a reverse diffusion process (which is learned). A diffusion model can be trained to be able to perform a generative process (e.g., a denoising process). One example goal of a diffusion model is to be able to denoise any arbitrary noise added to input data (e.g., a video).

Figure 3:
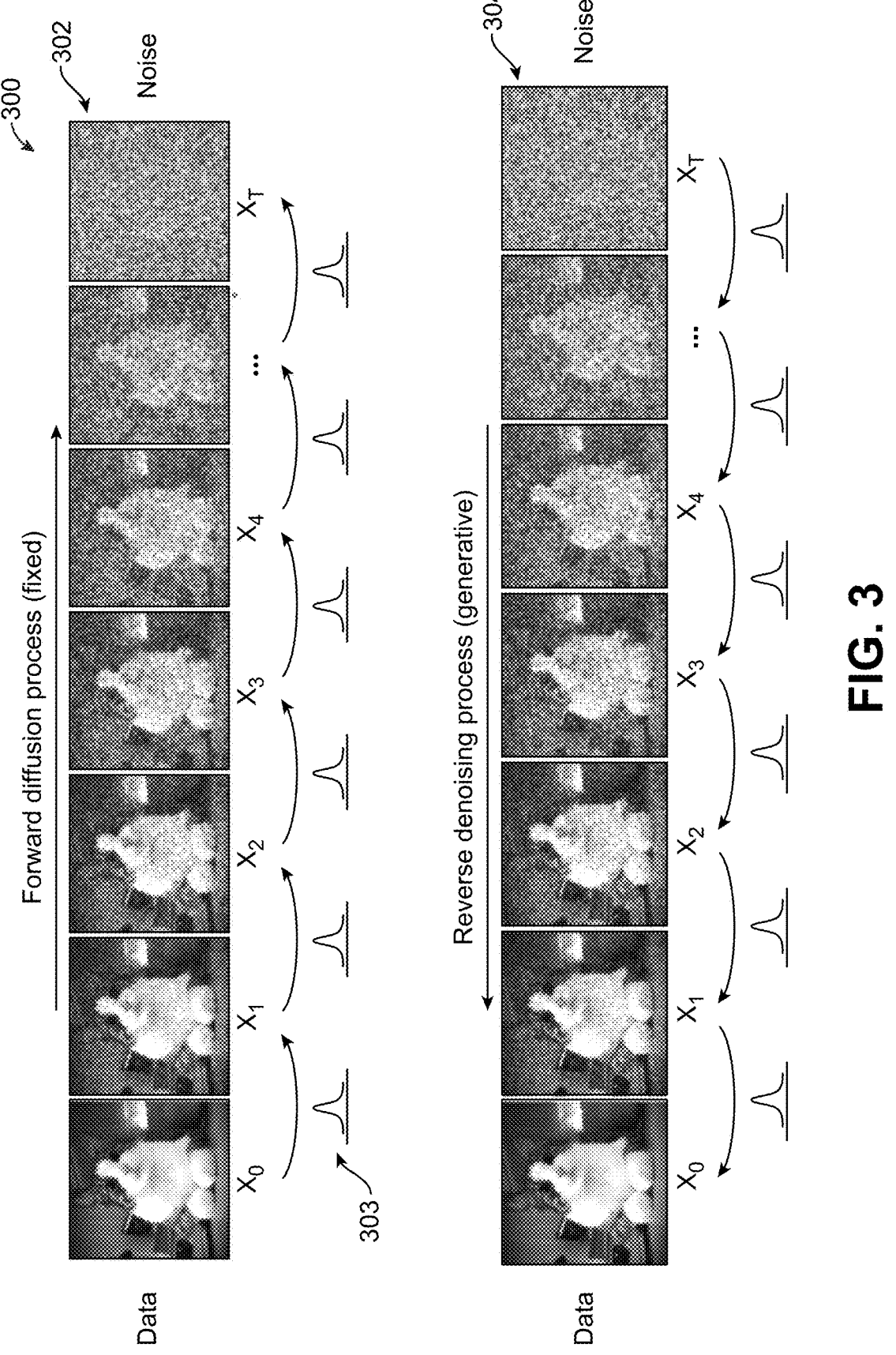
FIG. 3 is a diagram illustrating a forward diffusion process and a reverse diffusion process of a diffusion model, in accordance with some aspects.

FIG. 3 provides two sets of images 300 that show the forward diffusion process (which is fixed) and the reverse diffusion process (which is learned) of a diffusion model. As shown in the forward diffusion process of FIG. 3, noise 303 is gradually added to a first set of images 302 at different time steps for a total of T time steps (e.g., making up a Markov chain), producing a sequence of noisy samples $X_1$ through $X_T$. In one illustrative example, the noise 303 is Gaussian noise. Each time step can correspond to each consecutive image of the first set of images 302 shown in FIG. 3. The initial image $X_0$ of FIG. 3 is of a cat. Addition of the noise 303 to each image (corresponding to noisy samples $X_1$ to $X_T$) results in gradual diffusion of the pixels in each image until the final image (corresponding to sample $X_T$) essentially matches the noise distribution. For example, by adding the noise, each data sample $X_1$ through $X_T$ gradually loses its distinguishable features as the time step becomes larger, eventually resulting in the final sample $X_T$ being equivalent to the target noise distribution, for instance a unit variance zero-centered Gaussian $\mathcal{N}(0, 1)$.

The second set of images 304 shows the reverse diffusion process in which $X_T$ is the starting point with a noisy image (e.g., one that has Gaussian noise). The diffusion model can be trained to reverse the diffusion process (e.g., by training a model $p_\theta(x_{t-1}|x_t)$) to generate new data. In one illustrative example, a diffusion model can be trained by finding the reverse Markov transitions that maximize the likelihood of the training data. By traversing backwards along the chain of time steps, the diffusion model can generate the new data. For example, as shown in FIG. 3, the reverse diffusion process proceeds to generate $X_0$ as the image of the cat.

As noted previously, once captured, images and videos can be further processed for certain effects. For example, video enhancement aims to restore a sequence of frames, perturbed by some degradation process, to high quality. This general class of problems includes, for example, super-resolution, compressed video enhancement, and denoising.

Existing machine learning (e.g., neural network)-based video enhancement methods can be divided into unidirectional and bidirectional approaches, indicating whether the method has access to future frames when enhancing the current frame. Both categories have merits and disadvantages. Unidirectional approaches have access to only previous frame information, or occasionally up to one future (unenhanced) frame. These methods can therefore potentially run in real time, but may struggle with long-term dependencies and temporal consistency. Bidirectional approaches enhance all frames (past and future) simultaneously, and can use past and future information freely. Using past and future frames results in improved temporal consistency and allows for highly parallelized inference, but at the cost of increased memory usage and latency (e.g., not allowing for real-time operation for applications such as teleconferencing, video streaming, etc.).

Diffusion models (or diffusion probabilistic models (DPMs)) can be used for video enhancement in some cases. DPM-based video enhancement approaches typically fall in the bidirectional category, using architectures that process multiple frames simultaneously using three-dimensional (3D) convolutions or temporal attention layers. Processing multiple frames simultaneously enables parallel sampling for adjacent frames, but provides little flexibility (e.g., using the same fixed number of steps for all frames, even when consecutive frames are similar). Additionally, many DPM-based works omit frame alignment, instead choosing to let the model do the necessary processing in the absence of frame alignment. Other DPM-based video enhancement methods provide context information as input to the DPM (e.g., depth maps) in order to improve fidelity in video-to-video translation. However, even for these, frame alignment is typically implicit. It can be argued that the convergence to bidirectional approaches without explicit alignment is an advantage, as custom flow estimators or warping operators are no longer needed. However, letting go of such priors usually comes at a cost in compute, as the DPM now has to perform these tasks implicitly.

As noted previously, systems and techniques are described herein for performing frame enhancement (e.g., video super-resolution, sharpening, etc.) using a video enhancement diffusion model, which provide a general-purpose, high quality, low-delay frame enhancement (e.g., video super-resolution, sharpening, etc.) algorithm enabling more general applications than existing super resolution systems. For example, the video enhancement diffusion model can be trained based on diffusion-based training, which can provide perceptual quality. In some cases, optical flow can be performed for temporal modeling (e.g., in the pixel-space using optical flow estimation and backward warping or in the feature-space using deformable convolutions), which can provide temporal consistency. For instance, the model can use explicit motion estimation between input frames, and can be conditioned on the motion between the input frames. Recurrent upsampling can also be performed (e.g., by performing the diffusion process sequentially frame-by-frame) instead of parallel upsampling. For example, processing frames in a recurrent manner results in a sequential dependency, in which case parallel sampling may not be performed. However, performing recurrent processing of frames (e.g., by performing the diffusion process sequentially frame-by-frame) can be slower than "parallel" sampling of all or a number of frames in the video. The inherent delay of recurrent processing (e.g., due to the lack of parallel sampling) can be compensated for by reusing information from a previous time step, such as by reusing a previous diffusion latent, skipping sampling steps, reusing sampling steps, and/or any adaptation thereof of the noise and sampling scheme. For example, the delay can be compensated for by reusing or omitting sampling steps between adjacent timesteps. In some cases, the video enhancement diffusion model described herein can perform in a unidirectional video enhancement setting.

Examples will be described herein using video super resolution as an illustrative example of a frame enhancement operation that can be performed by the video enhancement diffusion model. However, in some aspects, the video enhancement diffusion model can be trained to perform other frame enhancement operations.

FIG. 4 is a diagram illustrating an example of a video model 400 including a video enhancement diffusion model 408 according to aspects described herein. As shown, the input to the video enhancement diffusion model 408 includes an input low-resolution frame 404, input noise 406, and one or more previously-upsampled frames 402. The one or more previously-upsampled frames 402 can include a frame prior to the current input low-resolution frame 404 (e.g., a frame $x_{t-1}$ when the input low-resolution frame 404 is frame $x_t$). The input noise 406 can include a noise map. The video enhancement diffusion model 408 can generate an output upsampled frame 410 based on the input low-resolution frame 404, the input noise 406, and the one or more previously-upsampled frames 402. The output upsampled frame 410 has a higher resolution than the input low-resolution frame 404, but with high perceptual quality and high temporal consistency with previous frames.

As noted previously, most existing video super-resolution methods access future low-resolution frames and are thus not suitable for low-delay applications. As shown in FIG. 4, future low-resolution frames are not needed to perform video super resolution. Use of a diffusion model for the video enhancement diffusion model 408 leads to higher perceptual quality compared to other machine learning approaches.

FIG. 5 is a diagram illustrating another example of a video model 500 including a video enhancement diffusion model 508 according to aspects described herein. Similar to the video model 400 of FIG. 4, the input to the video enhancement diffusion model 508 of FIG. 5 includes an input low-resolution frame 504 and input noise 506. The input noise 506 can include a noise map.

The video model 500 also includes a flow estimation engine 514. The flow estimation engine 514 can estimate or determine optical flow between the current input low-resolution frame 504 and a previous low-resolution frame 505 (e.g., a frame prior to the current input low-resolution frame 504, such as a frame $x_{t-1}$ when the input low-resolution frame 504 is frame $x_t$). In some aspects, the flow estimation engine 514 is a machine-learning based optical flow estimator, such as a neural network-based optical flow estimator. For example, the flow estimation engine 514 can be a neural network model (e.g., a CNN, RNN, etc.) trained to estimate optical flow between frames. The neural network model can be trained using any training technique, such as supervised learning techniques, semi-supervised learning techniques, unsupervised learning techniques, self-supervised learning techniques, or other training technique. Using supervised learning as an illustrative example, a training dataset can include one or more videos and ground truth for the training can include optical flow maps for frames of the video. A loss (e.g., mean-squared error (MSE) or other loss) can be determined based on a comparison of estimated optical flow maps output by the flow estimation engine 514 with the ground truth optical flow maps. The loss can be used to perform backpropagation to tune parameters (e.g., weights, biases, etc.) of the neural network of the flow estimation engine 514.

In some aspects, the flow estimation engine 514 can perform optical flow motion estimation on a pixel-by-pixel basis. For instance, for each pixel in the previous low-resolution frame 505, motion estimation f defines the location of the corresponding pixel in the input low-resolution frame 504. The motion estimation f for each pixel can include an optical flow vector (e.g., a motion vector) indicating a movement of the pixel between the frames. In some examples, an optical flow map (e.g., also referred to as a motion vector map) can be generated based on the computation of the optical flow vectors between the frames. In some cases, the optical flow maps can include an optical flow vector for each pixel in a frame, where each vector indicates a movement of a pixel between the frames. For instance, a dense optical flow can be computed between frames to generate optical flow vectors for each pixel in a frame, which can be included in a dense optical flow map. In some cases, the optical flow map can include vectors for less than all pixels in a frame. In some examples, the optical flow vector for a pixel can be a displacement vector (e.g., indicating horizontal and vertical displacements, such as horizontal (x-) and vertical (y-) displacements) showing the movement of a pixel from the previous low-resolution frame 505 to the input low-resolution frame 504.

A warping engine 516 of the video model 500 can warp a previously-upsampled frame 503 (e.g., upsampled by the video model 500) to generate a warped previously-up-sampled frame 517 using the determined optical flow between the input low-resolution frame 504 and the previous low-resolution frame 505. For example, to generate the warped previously-upsampled frame 517, the warping engine 516 can adjust (e.g., move) each pixel of the previously-upsampled frame 503 by an amount (e.g., in a horizontal and vertical direction) indicated by a respective optical flow vector (or motion vector) determined for each pixel.

As shown in FIG. 5, the warped previously-upsampled frame 517 generated by the warping engine 516 based on the optical flow can be used as an additional input to the video enhancement diffusion model 508. The video enhancement diffusion model 508 can generate an output upsampled frame 510 based on the input low-resolution frame 504, the input noise 506, and the warped previously-upsampled frame 517. The output upsampled frame 510 has a higher resolution than the input low-resolution frame 504 with high perceptual quality and high temporal consistency with previous frames. For example, by estimating optical flow using low-resolution frames (e.g., the input low-resolution frame 504 and the previous low-resolution frame 505) and then warping the previously-upsampled frame 503 using the optical flow, the upsampling prediction (the output upsampled frame 510) will be closer (more temporally consistent) to the previous upsampled frame 503.

In some aspects, one or more deformable convolutions can perform feature-space warping using the optical flow determined between the input low-resolution frame 504 and the previous low-resolution frame 505 in the feature-space (e.g., features output by one or more layers of the machine learning system of the video model 500). For example, a deformable convolutional kernel or filter can process features (e.g., feature vectors or other feature representation) output by one or more layers of a neural network making up the video model, together with an optical flow map 500, to perform warping based on the optical flow. In some cases, to perform the warping, a deformable convolution can replace a pixel value as a weighted sum of other pixel values in a particular region or neighborhood of pixels, where the optical flow map can specify the locations of the pixel values in the region or neighborhood of pixels around the pixel value.

As shown in FIG. 5, auxiliary inputs (e.g., depth map, albedo map, etc.) are not needed, making the solution applicable to a wide variety of scenarios or use cases. Many other VSR method, but also applications that use flow estimation, make use of auxiliary inputs (e.g., depth map, albedo map, etc.).

In some cases, the input noise provided to one or more of the video enhancement diffusion models described herein (e.g., the input noise 406 provided to the video enhancement diffusion model 408 of FIG. 4 or the input noise 406 provided to the video enhancement diffusion model 508 of FIG. 5) can be resampled from a target distribution of noise (e.g., unit variance, zero-centered Gaussian noise) at certain points or intervals. For example, as noted above, the input noise (e.g., the noise 406 and/or the noise 506) can include a noise map (or noise image). In one illustrative example, the input noise can be a map/image of Gaussian noise at a particular resolution (e.g., 4K resolution). Resampling the input noise refers to obtaining a new noise map from target distribution of noise (e.g., a new map of Gaussian noise different from the prior input noise map), such as by drawing a new sample from a Gaussian noise distribution.

In one illustrative example, the input noise can be resampled at every time step (or a subset of the time timesteps) in the input video sequence. In another illustrative example, the input noise can be resampled once per sequence of frames of the input video sequence (e.g., a sequence of frames can include 12 frames, 24 frames, 60 frames, 120 frames, or any other number of frames). In such an example, the noise can be constant for the number of frames (e.g., 12 frames, 24 frames, etc.) within each sequence and can be resampled at the first frame of each sequence. In another illustrative example, the input noise can be resampled when a scene cut is detected (e.g., a change in a scene from one frame to another frame). In another illustrative example, the input noise can be resampled at a set time interval (e.g., every 0.5 seconds, every 1 second, or other time interval).

FIG. 6 is a diagram illustrating another example of a video model 600 including a video enhancement diffusion model 608 according to aspects described herein. Similar to the video model 400 of FIG. 4, the video model 600 includes a flow estimation engine 614 and a frame warping engine 616. The flow estimation engine 614 can perform the same operations as those of the flow estimation engine 514 described above with respect to FIG. 5. For example, the flow estimation engine 614 can estimate or determine optical flow between a current input low-resolution frame 604 and a previous low-resolution frame 605.

The frame warping engine 616 can perform the same operations as those of the warping engine 516 described above with respect to FIG. 5. For example, the frame warping engine 616 can warp a previously-upsampled frame 603 (e.g., upsampled by the video model 600) to generate a warped previously-upsampled frame 617 using the determined optical flow between the input low-resolution frame 604 and the previous low-resolution frame 605. In some cases, to generate the warped previously-upsampled frame 617, the warping engine 616 can adjust (e.g., move) each pixel of the previously-upsampled frame 603 by an amount (e.g., in a horizontal and vertical direction) indicated by a respective optical flow vector (or motion vector) determined for each pixel.

The video model 600 further includes a noise warping engine 624. In some aspects, the noise warping engine 624 and the frame warping engine 616 can be a same warping engine (e.g., a shared warping engine can warp the previous noise input 622 and the previously-upsampled frame 603). The noise warping engine 624 can warp previous noise input 622 to generate warped noise 619 using the determined optical flow between the input low-resolution frame 604 and the previous low-resolution frame 605. For example, the previous noise input 622 can include a frame with pixel values that are sampled from a noise distribution (e.g., a Gaussian noise distribution). The noise warping engine 624 can adjust (e.g., move) each pixel of the previous noise input 622 by an amount (e.g., in a horizontal and vertical direction) indicated by a respective optical flow vector (or motion vector) determined for each pixel of the input low-resolution frame 604.

In addition to the input low-resolution frame 604 and input noise 606 (e.g., a noise map or image), the warped previously-upsampled frame 617 generated by the frame warping engine 616 and the warped noise 619 generated by the noise warping engine 624 can be used as input to the video enhancement diffusion model 608. The video enhancement diffusion model 608 can generate an output upsampled frame 610 based on the input low-resolution frame 604, the input noise 606, the warped previously-upsampled frame 617, and the warped noise 619. The output upsampled frame 610 has a higher resolution than the input low-resolution frame 604 with high perceptual quality and high temporal consistency with previous frames.

In addition to using optical flow to warp the previously-upsampled frame 603, the video model 600 of FIG. 6 can also warp the input noise 606 (e.g., a noise map) to generate warped noise 619, which can be used as input to the video enhancement diffusion model 608. In some cases, the warped noise 619 can replace the input noise 606 or can be combined (e.g., as a linear combination between previously-sampled noise and current re-sampled noise) with the input noise 606. As noted previously, in some cases, the input noise provided to one or more of the video enhancement diffusion models described herein (e.g., the input noise 406 provided to the video enhancement diffusion model 408 of FIG. 4 or the input noise 406 provided to the video enhancement diffusion model 508 of FIG. 5) can be resampled at certain points or intervals (e.g., at each time step, for each sequence of frames, at a predetermined time interval, when a scene cut or change is detected, any combination thereof, and/or other points or intervals). Warping the noise map from one or more previous frames with optical flow, as shown in FIG. 6, can help enforce consistent texture on objects (e.g., moving objects) in a scene. In some aspects, a combination of warped previous noise and newly sampled noise can be used, which can help with occlusions (e.g., where portions of the scene are occluded), scene cuts (e.g., where a new scene is presented from one frame to another), etc.

In some aspects, the video enhancement diffusion model (e.g., the video enhancement diffusion model 508 of FIG. 5, the video enhancement diffusion model 608 of FIG. 6, etc.) described herein can be latent-variable models that learn to perform a reverse diffusion process to reverse a forward diffusion process destroying the data in T steps, for example as shown below:

$$q(x_{1:T} \mid x_0) = \prod_{t=1}^{T} q(x_t \mid x_{t-1}), \; q(x_t \mid x_{t-1}) = \mathcal{N}(x_t; \alpha_t x_{t-1}, \sigma_t^2 I) \tag{1}$$

In Equation (1), $\alpha_t$ and $\sigma_t$ control the noise schedule (referring to the progression of the forward diffusion process). The generative model is then a Markov chain with Gaussian transitions, here with fixed diagonal covariance according to the schedule $\sigma_t^2$, and with user-specified conditioning c:

$$p_\theta(x_{0:T}) = p(x_T) \prod_{t=1}^{T} p_\theta(x_{t-1} \mid x_t), \tag{2}$$

-continued $$p_\theta(x_t \mid x_{t-1}) = \mathcal{N}(x_{t-1}; \mu_\theta(x_t, t, c), \sigma_t^2 I)$$

Sampling from $p_\theta(x)$ then involves T steps of ancestral sampling. To reduce the computational load of sampling from the diffusion model, a low number of sampling steps at test time can be performed, such as by respacing the sampling schedule (as described below) or through a more advanced technique such as step distillation.

In some cases, the video enhancement diffusion model (e.g., the video enhancement diffusion model 508 of FIG. 5, the video enhancement diffusion model 608 of FIG. 6, etc.) can be trained using the v parametrization. For example, the v-parametrization is an alternative objective for diffusion models that takes care of low signal-to-noise ratio (SNR) cases, essentially stabilizing training. Low SNR is increasingly likely when training for fewer and fewer diffusion steps. This is a motivation behind using an SNR+1 objective (also known as the v-parametrization). In some cases, the v parametrization may be better suited for a low number of steps than the commonly used $\epsilon$ objective. For example, the video enhancement system (including the video enhancement diffusion model) described herein can be designed to have a low number of steps to satisfy both low complexity and low-delay, as many steps use more compute and require more time. The system can perform diffusion in the residual space, re-uses noise from previous time steps, and uses specific scheduling and noise (e.g., denoising diffusion implicit model (DDIM)), resulting in a low number of steps.

In some aspects, the space of residuals $r = x_0 - \tilde{x}_0$ can be modeled, instead of modeling the space of images directly. If $\tilde{x}_0$ is of lower resolution than $x_0$, naive upsampling (e.g., bicubic interpolation) can be used as a preparatory step. For instance, in some examples, at least two options for residuals can be used, including a spatial residual and a temporal residual. For a spatial residual, $$r = x_0^t - upsample(\tilde{x}_0^t),$$

where $$\tilde{x}_0^t$$

is the low-resolution frame. For a temporal residual, $$r = x_0^t - warp(\hat{x}_0^{t-1}, f_{t-1 \to t}),$$

where $$\hat{x}_0^{t-1}$$

is the previously-upsampled frame and f is the optical flow vector field.

The video enhancement diffusion model can thus learn to predict $v = \alpha_t \epsilon_t - \sigma_t r$, where $\alpha_t$ and $\sigma_t$ control the noise schedule and r are the residuals ($r = x_0 - \tilde{x}_0$), as described previously. In one illustrative example, as noted above, the SNR+1 training objective (or v-parametrization) can be used, which is based on the weight coefficient equal to the SNR (represented as $$\frac{\alpha_t^2}{\sigma_t^2})$$

plus 1:

$$\mathcal{L}_\theta = \|v_t - \hat{v}_t\|_2^2 = (1 + \frac{\alpha_t^2}{\sigma_t^2})\|r_t - \hat{r}_t\|_2^2. \tag{3}$$

where $\hat{v}_t$ is can be the output of the video enhancement diffusion model. It should be noted that the output may differ depending on the exact loss formulation, and that SNR+1 (v parameterization) is given only as an example.

In some aspects, an image model can be used to perform super-resolution on single frames (e.g., for a first or initial frame or other individual frames when no previous frames are available) of a sequence of frames (e.g., a video). For instance, when performing image enhancement (e.g., super resolution) on frames, the image model can be used for a first or initial frame of a sequence when a previous low-resolution frame is unavailable. The image model can be a conditional diffusion model where conditioning c can be the first low-resolution frame (e.g., the frame-to-enhance), $\tilde{x}_0^k$. Any super-resolution method can be used. Using a diffusion model with similar architecture to the video model allows reusing weights. In such aspects, a video model including the video enhancement diffusion model (e.g., the video model 500 including the video enhancement diffusion model 508, the video model 600 including the video enhancement diffusion model 608, etc.) described herein can be applied to the remaining frames of the sequence of frames (e.g., frames occurring after the first or initial frame).

Figure 7:
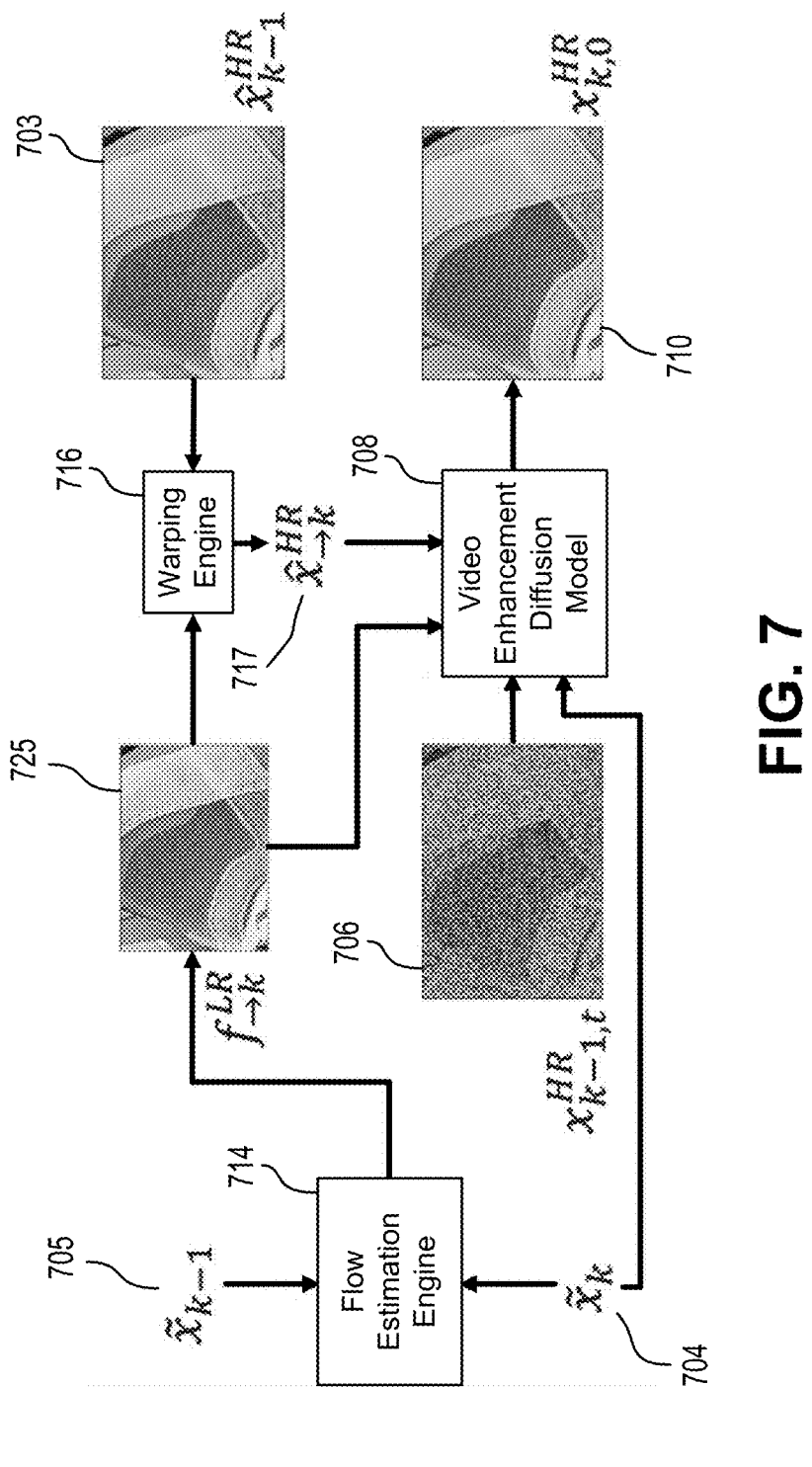
FIG. 7 is a diagram illustrating another example of a system for performing frame enhancement using a diffusion model, in accordance with some aspects.

As described above, the video enhancement diffusion model can take previously-enhanced frames into account as well, in which case the conditioning c can be as follows: $c = \{\tilde{x}_0^k, \hat{x}_0^{k-1}\}$. FIG. 7 is a diagram illustrating an illustrative example of a system 700 including the video enhancement diffusion model using such notation. As shown in FIG. 7, a flow estimation engine 714 receives as input a previous low-resolution frame 705 (denoted as $\hat{x}_0^{k-1}$) and a current low-resolution frame 704 (denoted as $\tilde{x}_0^k$). The previous low-resolution frame 705 can be a frame prior to the current input low-resolution frame 704. The flow estimation engine 714 can estimate or determine optical flow 725 (shown as an optical flow frame $f_{\to k}^{LR}$ including optical flow values, such as displacement values, for each pixel of the previous low-resolution frame 705) between the current input low-resolution frame 704 and the previous low-resolution frame 705, similar to that described with respect to FIG. 5 and FIG. 6.

A warping engine 716 can warp a previously-upsampled frame 703 (e.g., upsampled by the system 700) using the determined optical flow 725, resulting in generation of a warped previously upsampled frame 717. For example, the warping engine 716 can adjust (e.g., move a position of) each pixel of the previously-upsampled frame 703 by an amount (e.g., in a horizontal and vertical direction) indicated by a respective optical flow vector (or motion vector) indicated for each pixel in the optical flow 725.

The current low-resolution frame 704, the warped previously upsampled frame 717, and input noise 706 can input to a video enhancement diffusion model 708. The video enhancement diffusion model 708 can generate an output upsampled frame 710 based on the current low-resolution frame 704, the input noise 706, and the warped previously-upsampled frame 717. As described herein, by estimating the optical flow 725 using the current low-resolution frame 704 and the previous low-resolution frame 705 and warping the previously-upsampled frame 703 using the optical flow 725, the upsampled frame 710 will be closer (e.g., more temporally consistent) to the previous upsampled frame 703. As a result, the output upsampled frame 710 has a higher resolution than the current low-resolution frame 704 and with high perceptual quality and high temporal consistency with respect to previous frames (including the previous upsampled frame 703).

In some aspects, to improve temporal consistency, the previously-enhanced frame (e.g., frame $\hat{x}_0^{k-1}$) can be aligned with the current frame (frame $\hat{x}_0^k$, such as the input low-resolution frame 504 of FIG. 5, the input low-resolution frame 604 of FIG. 6, etc.) before providing the current frame as input to the video enhancement diffusion model, such as using optical flow, feature-based warping (e.g., with deformable convolutions), any combination thereof, and/or using other temporal modeling. In some cases, the diffusion model can also be conditioned on the optical flow field (e.g., the motion vector field) directly or on the previously-aligned (previously-warped) frame. In some examples, a pre-trained neural network optical flow estimator (e.g., using recurrent all-pairs field transforms (RAFT) as optical flow estimator) can be used (e.g., as the flow estimation engine 514 and/or flow estimation engine 614) to estimate or determine the motion between unenhanced frames (e.g., between the input low-resolution frame 504 and the previous low-resolution frame 512). To ensure that unenhanced frames are of the right resolution and to avoid re-training of the flow estimator, bicubic upsampling of low-resolution frames can be performed (e.g., by the video enhancement diffusion model or prior to being input to the video enhancement diffusion model) before determining the optical flow. As described previously, the estimated optical flow can be directly applied to the previously enhanced frame using backward warping, resulting in an aligned enhanced frame $\hat{x}_0^{k-1 \to k}$.

In some aspects, training the diffusion model can include two training stages: 1) training the image model to enhance frames in isolation (e.g., an initial or first frame of a video or other individual frames), and 2) training the video model, warm-started using the image model weights (e.g., using the trained weights of the image model as a starting point for the video model). In one illustrative example, the first stage of training can include approximately 500,000 steps, and the second stage of training can include approximately 500,000 steps. In some cases, when training the video model, the output of a fully trained image model may be used as conditioning. This may result in super-resolving all frames in the training dataset, which can become expensive in some examples. In other cases, a ground truth image can be perturbed with a fixed downsampling and upsampling operation to produce a proxy for the enhanced previous frame $\hat{x}_0^{k-1}$.

To sample from the image model, a respacing procedure can be performed and a denoising diffusion implicit model (DDIM) schedule can be used (e.g., due to its robustness when few sampling steps are used). For instance, respacing can be a different discretization of the same continuous function. In one illustrative example, using the function f(x)=x (linear), which can be a schedule where time is represented as continuous number between 0 and 1, where 0 indicates image distribution, and 1 noise distribution. Continuous time 0 to 1 can map discrete time 0 to T if there are T steps in the reverse process. The function can be discretized by sampling it with a number of points (e.g., 100 points, 1000 points, 2 points, etc.). The number of points correspond to the number of steps that will be taken in the diffusion process. The less steps, the greater the difference between input and output of this diffusion step. Too many steps may underutilize the model and increase compute unnecessarily, and too few steps may lead to the model being unable to represent such large differences and leading to an error. DDIM is a respacing procedure which mismatches the steps between training (e.g., 1000 steps) and evaluation (e.g., 100 steps) to make it more robust. In one illustrative example, a default of 75 sampling steps can be used.

In some cases, to sample from the video model, latents from previously enhanced frames can be used to speed up sampling. For example, using the previous latents can be beneficial for reducing sampling steps for videos that have similar or equal frames (e.g., in the extreme case of a still video where consecutive enhanced frames are exactly equal, zero sampling steps are needed and $\hat{x}_0^{k-1}$ can be reused). Reusing the latents from previous frames can help with temporal consistency as well. For instance, for image models $p_\theta(x)$, two samples starting from the same latent $x_t$ move closer as $t \to 0$, and may be equal when deterministic transitions are used. Assuming that a deterministic sampling scheme and architecture are used, and that the sampled latent at timestep T, $r_T \sim \mathcal{N}(0, I)$ precisely determines the sample for given conditioning. Intuitively, this means the motion vector $f^{k-1 \to k}$ provides information about how noise should be reused. If little to no motion occurs, there is likely no need to resample, but if a big motion occurs, one should sample a new noise vector.

In some cases, the video super-resolution techniques described herein can utilize optimized hardware acceleration. For instance, machine learning (ML) accelerators implemented by a computing device, such as a mobile computing device (e.g., a smartphone, tablet computer, etc.) and/or other edge computing device can be referred to as mobile ML accelerators. ML accelerators can be implemented as specialized microprocessors for accelerating various computations associated with performing inference using an ML model executing on the computing device. ML accelerators can be provided as general-purpose hardware, capable of performing acceleration for various types of ML operations and/or various ML networks and architectures. For example, a mobile ML accelerator included in a smartphone can be used to accelerate image processing, natural language processing (NLP), voice recognition, etc. Different ML operations, networks, and/or architectures can be associated with varying quantities of input channels. For example, image processing machine learning networks may utilize three-channel inputs (e.g., one red channel, one blue channel, and one green channel for an RGB image input). NLP machine learning networks may utilize inputs having dozens of channels or more. For instance, an NLP machine learning network may utilize separate channels for different word embeddings, vocabularies, phrases, etc.

FIG. 8 is a flowchart illustrating an example of a process 800 for processing frame data to perform frame enhancement on one or more frames using the techniques described herein. The process 800 can be performed by a computing device (or apparatus) or a component (e.g., a chipset, codec, etc.) of the computing device. The computing device may be a mobile device (e.g., a mobile phone), a network-connected wearable such as a watch, an extended reality (XR) device (e.g., a virtual reality (VR) device or augmented reality (AR) device), a vehicle or component or system of a vehicle, or other type of computing device. The operations of the process 800 may be implemented as software components that are executed and run on one or more processors (e.g., CPU 102, GPU 104, DSP 106, and/or NPU 108 of FIG. 1, the processor 910 of FIG. 9, or other processor(s)). Further, the transmission and reception of signals by the computing device in the process 800 may be enabled, for example, by one or more antennas, one or more transceivers (e.g., wireless transceiver(s)), and/or other communication components of the computing device.

At block 802, the computing device (or component thereof) can determine an optical flow between a current frame having a first resolution and a first previous frame having the first resolution. For example, the first previous frame can be a frame immediately prior to the current frame in a video (e.g., a frame $x_{t-1}$ when the current frame is frame $x_t$). Referring to FIG. 5 as an illustrative example, the flow estimation engine 514 can estimate or determine optical flow between the current input low-resolution frame 504 and the previous low-resolution frame 505. In some cases, the optical flow includes a respective motion vector for each pixel of the current frame (e.g., a first motion vector for a first pixel of the current frame, a second motion vector for a second pixel of the current frame, a third motion vector for a third pixel of the current frame, and so on).

At block 804, the computing device (or component thereof) can warp a second previous frame having a second resolution based on the determined optical flow to generate a warped previous frame having the second resolution, where the second resolution is higher than the first resolution. For instance, the second previous frame can be an upsampled version of the first previous frame. Referring to FIG. 5 as an illustrative example, the warping engine 516 can warp the previously-upsampled frame 503 to generate the warped previously upsampled frame 517.

At block 806, the computing device (or component thereof) can process, using a diffusion machine learning model (e.g., the video enhancement diffusion model described herein, such as the video enhancement diffusion model 508, the video enhancement diffusion model 608, etc.), a noise frame, the current frame, and the warped previous frame to generate an output frame having the second resolution (e.g., an upsampled version of the current frame). Referring to FIG. 5 as an illustrative example, the video enhancement diffusion model 508 can process the warped previously-upsampled frame 517, the input low-resolution frame 504, and the input noise 506 to generate the output upsampled frame 510. In some aspects, the noise frame is sampled from a Gaussian noise distribution. As noted above, in some cases, the optical flow includes a respective motion vector for each pixel of the current frame. In such cases, to warp the second previous frame, the computing device (or component thereof) can adjust each pixel of the second previous frame by an amount indicated by each respective motion vector of the optical flow.

In some aspects, the computing device (or component thereof) can warp a previous noise frame based on the determined optical flow to generate a warped noise frame. Referring to FIG. 6 as an illustrative example, the noise warping engine 624 can warp the previous noise input 622 based on the optical flow determined from the optical flow estimation engine 614 to generate the warped noise 619. In such aspects, the computing device (or component thereof)

can generate the output frame further based on processing the warped noise frame using the diffusion machine learning model (e.g., as shown in FIG. 6). In some cases, the computing device (or component thereof) can use the warped noise frame instead of the noise frame to generate the output frame. For example, the computing device (or component thereof) can process, using the diffusion machine learning model, the warped noise frame, the current frame, and the warped previous frame to generate the output frame having the second resolution. In some cases, the computing device (or component thereof) can use a combination (e.g., a linear combination) of the noise frame and the warped noise frame to generate the output frame. For example, the computing device (or component thereof) can process, using the diffusion machine learning model, the combination of the noise frame and the warped noise frame, the current frame, and the warped previous frame to generate the output frame having the second resolution.

In some cases, the computing device (or component thereof) can sequentially (or recurrently) process a plurality of consecutive frames of the video. As described previously, recurrent upsampling of the consecutive frames (e.g., instead of upsampling multiple frames parallel) can provide low delay and thus result in a low-latency application. In some aspects, the computing device (or component thereof) can reuse a previous diffusion latent of the diffusion machine learning model, reuse at least one sampling step between timesteps of the diffusion machine learning model, and/or skip one or more sampling steps between the timesteps of the diffusion machine learning model. As described previously, re-using such information can compensate for delay in performing the recurrent/sequential processing.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
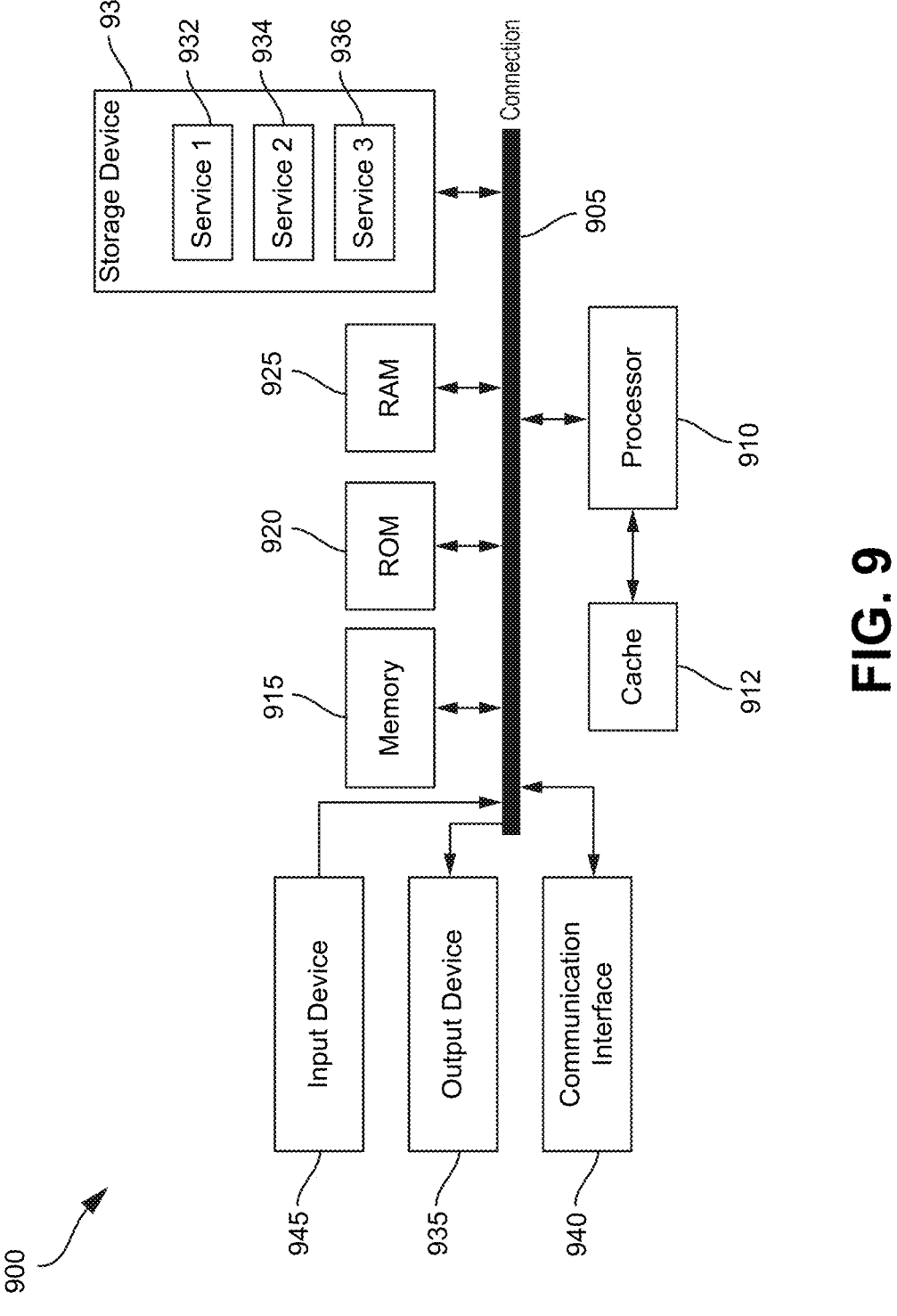
FIG. 9 is a block diagram illustrating an example of a computing system for implementing certain aspects described herein.

FIG. 9 illustrates an example computing device architecture 900 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 900 are shown in electrical communication with each other using connection 905, such as a bus. The example computing device architecture 900 includes a processing unit (CPU or processor) 910 and computing device connection 905 that couples various computing device components including computing device memory 915, such as read only memory (ROM) 920 and random-access memory (RAM) 925, to processor 910.

Computing device architecture 900 can include a cache of high-speed memory connected directly with, in close proximity to, or integrated as part of processor 910. Computing device architecture 900 can copy data from memory 915 and/or the storage device 930 to cache 912 for quick access by processor 910. In this way, the cache can provide a performance boost that avoids processor 910 delays while waiting for data. These and other engines can control or be configured to control processor 910 to perform various actions. Other computing device memory 915 may be available for use as well. Memory 915 can include multiple different types of memory with different performance characteristics. Processor 910 can include any general-purpose processor and a hardware or software service, such as service 1 932, service 2 934, and service 3 936 stored in storage device 930, configured to control processor 910 as well as a special-purpose processor where software instructions are incorporated into the processor design. Processor 910 may be a self-contained system, containing multiple cores or processors, a bus, memory controller, cache, etc. A multi-core processor may be symmetric or asymmetric.

To enable user interaction with the computing device architecture 900, input device 945 can represent any number of input mechanisms, such as a microphone for speech, a touch-sensitive screen for gesture or graphical input, keyboard, mouse, motion input, speech and so forth. Output device 935 can also be one or more of a number of output mechanisms known to those of skill in the art, such as a display, projector, television, speaker device, etc. In some instances, multimodal computing devices can enable a user to provide multiple types of input to communicate with computing device architecture 900. Communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. Storage device 930 can include services 932, 934, 936 for controlling processor 910. Other hardware or software modules or engines are contemplated. Storage device 930 can be connected to the computing device connection 905. In one aspect, a hardware module that performs a particular function can include the software component stored in a computer-readable medium in connection with the necessary hardware components, such as processor 910, connection 905, output device 935, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram.

Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C. A and B and C, or any duplicate information or data (e.g., A and A, B and B, C and C. A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y. and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method of processing image data of a current frame, comprising: determining an optical flow between the current frame having a first resolution and a first previous frame having the first resolution; warping a second previous frame having a second resolution based on the determined optical flow to generate a warped previous frame having the second resolution, the second resolution being higher than the first resolution; and processing, using a diffusion machine learning model, a noise frame, the current frame, and the warped previous frame to generate an output frame having the second resolution.

Aspect 2. The method of Aspect 1, further comprising: warping a previous noise frame based on the determined optical flow to generate a warped noise frame;

wherein the output frame is generated further based on processing the warped noise frame using the diffusion machine learning model.

Aspect 3. The method of any one of Aspects 1 or 2, wherein the optical flow includes a respective motion vector for each pixel of the current frame.

Aspect 4. The method of Aspect 3, wherein warping the second previous frame comprises adjusting each pixel of the second previous frame by an amount indicated by each respective motion vector of the optical flow.

Aspect 5. The method of any one of Aspects 1 to 4, wherein the output frame is an upsampled version of the current frame.

Aspect 6. The method of any one of Aspects 1 to 5, wherein the second previous frame is an upsampled version of the first previous frame.

Aspect 7. The method of any one of Aspects 1 to 6, wherein the first previous frame is a frame immediately prior to the current frame in a video.

Aspect 8. The method of Aspect 7, further comprising sequentially processing a plurality of consecutive frames of the video.

Aspect 9. The method of any one of Aspects 1 to 8, further comprising at least one of: reusing a previous diffusion latent of the diffusion machine learning model; reusing at least one sampling step between timesteps of the diffusion machine learning model; or skipping one or more sampling steps between the timesteps of the diffusion machine learning model.

Aspect 10. The method of any one of Aspects 1 to 9, wherein the noise frame is sampled from a Gaussian noise distribution.

Aspect 11. An apparatus for processing image data of a current frame, comprising: at least one memory configured to store the image data; and at least one processor coupled to the at least one memory, the at least one processor configured to: determine an optical flow between the current frame having a first resolution and a first previous frame having the first resolution; warp a second previous frame having a second resolution based on the determined optical flow to generate a warped previous frame having the second resolution, the second resolution being higher than the first resolution; and process, using a diffusion machine learning model, a noise frame, the current frame, and the warped previous frame to generate an output frame having the second resolution.

Aspect 12. The apparatus of Aspect 11, wherein the at least one processor is configured to: warp a previous noise frame based on the determined optical flow to generate a warped noise frame; and generate the output frame further based on processing the warped noise frame using the diffusion machine learning model.

Aspect 13. The apparatus of any one of Aspects 11 or 12, wherein the optical flow includes a respective motion vector for each pixel of the current frame.

Aspect 14. The apparatus of Aspect 13, wherein, to warp the second previous frame, the at least one processor is configured to adjust each pixel of the second previous frame by an amount indicated by each respective motion vector of the optical flow.

Aspect 15. The apparatus of any one of Aspects 11 to 14, wherein the output frame is an upsampled version of the current frame.

Aspect 16. The apparatus of any one of Aspects 11 to 15, wherein the second previous frame is an upsampled version of the first previous frame.

Aspect 17. The apparatus of any one of Aspects 11 to 16, wherein the first previous frame is a frame immediately prior to the current frame in a video.

Aspect 18. The apparatus of Aspect 17, wherein the at least one processor is configured to sequentially process a plurality of consecutive frames of the video.

Aspect 19. The apparatus of any one of Aspects 11 to 18, wherein the at least one processor is configured to at least one of: reuse a previous diffusion latent of the diffusion machine learning model; reuse at least one sampling step between timesteps of the diffusion machine learning model; or skip one or more sampling steps between the timesteps of the diffusion machine learning model.

Aspect 20. The apparatus of any one of Aspects 11 to 19, wherein the noise frame is sampled from a Gaussian noise distribution.

Aspect 21. A non-transitory computer-readable storage medium comprising instructions stored thereon which, when executed by at least one processor, causes the at least one processor to perform operations according to any one of Aspects 1 to 10.

Aspect 22. An apparatus for processing image data, comprising one or more means for performing operations according to any one of Aspects 1 to 10.

What is claimed is:

1. An apparatus for processing image data of a current frame, comprising:

at least one memory configured to store the image data; and at least one processor coupled to the at least one memory, the at least one processor configured to:

determine an optical flow between the current frame having a first resolution and a first previous frame having the first resolution;

warp a second previous frame having a second resolution based on the determined optical flow to generate a warped previous frame having the second resolution, the second resolution being higher than the first resolution; and process, using a diffusion machine learning model, a noise frame that is externally supplied and resampled at one or more time steps or frames, the current frame, and the warped previous frame to generate an output frame having the second resolution.

2. The apparatus of claim 1, wherein the at least one processor is configured to:

warp a previous noise frame based on the determined optical flow to generate a warped noise frame; and generate the output frame further based on processing the warped noise frame using the diffusion machine learning model.

3. The apparatus of claim 1, wherein the optical flow includes a respective motion vector for each pixel of the current frame.

4. The apparatus of claim 3, wherein, to warp the second previous frame, the at least one processor is configured to adjust each pixel of the second previous frame by an amount indicated by each respective motion vector of the optical flow.

5. The apparatus of claim 1, wherein the output frame is an upsampled version of the current frame.

6. The apparatus of claim 1, wherein the second previous frame is an upsampled version of the first previous frame.

7. The apparatus of claim 1, wherein the first previous frame is a frame immediately prior to the current frame in a video.

8. The apparatus of claim 7, wherein the at least one processor is configured to sequentially process a plurality of consecutive frames of the video.

9. The apparatus of claim 1, wherein the at least one processor is configured to at least one of:

reuse a previous diffusion latent of the diffusion machine learning model;

reuse at least one sampling step between timesteps of the diffusion machine learning model; or skip one or more sampling steps between the timesteps of the diffusion machine learning model.

10. The apparatus of claim 1, wherein the noise frame is sampled from a Gaussian noise distribution.

11. A method of processing image data of a current frame, comprising:

determining an optical flow between the current frame having a first resolution and a first previous frame having the first resolution;

warping a second previous frame having a second resolution based on the determined optical flow to generate a warped previous frame having the second resolution, the second resolution being higher than the first resolution; and processing, using a diffusion machine learning model, a noise frame that is externally supplied and resampled at one or more time steps or frames, the current frame, and the warped previous frame to generate an output frame having the second resolution.

12. The method of claim 11, further comprising:

warping a previous noise frame based on the determined optical flow to generate a warped noise frame;

wherein the output frame is generated further based on processing the warped noise frame using the diffusion machine learning model.

13. The method of claim 11, wherein the optical flow includes a respective motion vector for each pixel of the current frame.

14. The method of claim 13, wherein warping the second previous frame comprises adjusting each pixel of the second previous frame by an amount indicated by each respective motion vector of the optical flow.

15. The method of claim 11, wherein the output frame is an upsampled version of the current frame.

16. The method of claim 11, wherein the second previous frame is an upsampled version of the first previous frame.

17. The method of claim 11, wherein the first previous frame is a frame immediately prior to the current frame in a video.

18. The method of claim 17, further comprising sequentially processing a plurality of consecutive frames of the video.

19. The method of claim 11, further comprising at least one of:

reusing a previous diffusion latent of the diffusion machine learning model;

reusing at least one sampling step between timesteps of the diffusion machine learning model; or skipping one or more sampling steps between the timesteps of the diffusion machine learning model.

20. The method of claim 11, wherein the noise frame is sampled from a Gaussian noise distribution.

21. A non-transitory computer-readable storage medium comprising instructions stored thereon which, when executed by at least one processor, cause the at least one processor to:

determine an optical flow between a current frame having a first resolution and a first previous frame having the first resolution;

warp a second previous frame having a second resolution based on the determined optical flow to generate a warped previous frame having the second resolution, the second resolution being higher than the first resolution; and process, using a diffusion machine learning model, a noise frame that is externally supplied and resampled at one or more time steps or frames, the current frame, and the warped previous frame to generate an output frame having the second resolution.

22. The non-transitory computer-readable storage medium of claim 21, wherein the instructions, when executed by the at least one processor, cause the at least one processor to:

warp a previous noise frame based on the determined optical flow to generate a warped noise frame; and generate the output frame further based on processing the warped noise frame using the diffusion machine learning model.

23. The non-transitory computer-readable storage medium of claim 21, wherein the optical flow includes a respective motion vector for each pixel of the current frame.

24. The non-transitory computer-readable storage medium of claim 23, wherein, to warp the second previous frame, the instructions, when executed by the at least one processor, cause the at least one processor to adjust each pixel of the second previous frame by an amount indicated by each respective motion vector of the optical flow.

25. The non-transitory computer-readable storage medium of claim 21, wherein the output frame is an upsampled version of the current frame.

26. The non-transitory computer-readable storage medium of claim 21, wherein the second previous frame is an upsampled version of the first previous frame.

27. The non-transitory computer-readable storage medium of claim 21, wherein the first previous frame is a frame immediately prior to the current frame in a video.

28. The non-transitory computer-readable storage medium of claim 27, wherein the instructions, when executed by the at least one processor, cause the at least one processor to sequentially process a plurality of consecutive frames of the video.

29. The non-transitory computer-readable storage medium of claim 21, wherein the instructions, when executed by the at least one processor, cause the at least one processor to at least one of:

reuse a previous diffusion latent of the diffusion machine learning model;

reuse at least one sampling step between timesteps of the diffusion machine learning model; or skip one or more sampling steps between the timesteps of the diffusion machine learning model.

30. The non-transitory computer-readable storage medium of claim 21, wherein the noise frame is sampled from a Gaussian noise distribution.

\* \* \* \* \*